United States Patent
Honma et al.

(10) Patent No.: US 10,387,413 B2
(45) Date of Patent: Aug. 20, 2019

(54) SEARCH RESULT EVALUATION SYSTEM, NAVIGATION SYSTEM AND SEARCH RESULT EVALUATION METHOD

(71) Applicant: Clarion Co., Ltd., Saitama-shi, Saitama (JP)

(72) Inventors: Takeshi Honma, Tokyo (JP); Kazuaki Shima, Saitama (JP)

(73) Assignee: Clarion Co., Ltd., Saitama (JP)

( * ) Notice: Subject to any disclaimer, the term of this patent is extended or adjusted under 35 U.S.C. 154(b) by 499 days.

(21) Appl. No.: 15/025,584

(22) PCT Filed: Nov. 11, 2014

(86) PCT No.: PCT/JP2014/079840
§ 371 (c)(1),
(2) Date: Mar. 29, 2016

(87) PCT Pub. No.: WO2015/072450
PCT Pub. Date: May 21, 2015

(65) Prior Publication Data
US 2016/0239536 A1    Aug. 18, 2016

(30) Foreign Application Priority Data
Nov. 14, 2013   (JP) .................... 2013-235727

(51) Int. Cl.
*G06F 16/00*      (2019.01)
*G06F 16/2453*    (2019.01)
(Continued)

(52) U.S. Cl.
CPC ..... *G06F 16/2453* (2019.01); *G01C 21/3605* (2013.01); *G01C 21/3608* (2013.01);
(Continued)

(58) Field of Classification Search
CPC ............... G06F 17/30424; G06F 16/2453
(Continued)

(56) References Cited

U.S. PATENT DOCUMENTS 8,725,716 B1 * 5/2014 Riley ............... G06F 17/30867
707/707
9,110,975 B1 * 8/2015 Diligenti ........... G06F 17/30864
(Continued)

FOREIGN PATENT DOCUMENTS

JP      2011-022873 A    2/2011

OTHER PUBLICATIONS

Extended European Search Report received in corresponding European Application No. 14862537.9 dated Jul. 4, 2017.
(Continued)

*Primary Examiner* — Thu Nguyet T Le
(74) *Attorney, Agent, or Firm* — Mattingly & Malur, PC

(57) ABSTRACT

Provided is a search result evaluation system connected with a search device and that evaluates search results of the search device, the search result evaluation system including: a search unit that transmits a search query to the search device; and an evaluation unit that, if the evaluation unit receives search results from the search device, determines whether specifications of the search device have been modified, by evaluating the received search results, wherein, if the evaluation unit determines that the specifications of the search device have been modified, the evaluation unit outputs an anomaly signal to notify a manager of the search result evaluation system that the specifications of the search device have been modified.

7 Claims, 11 Drawing Sheets

(51) Int. Cl.
  *G06F 16/242* (2019.01)
  *G06F 16/29* (2019.01)
  *G06F 16/9537* (2019.01)
  *G01C 21/36* (2006.01)
  *G06F 16/903* (2019.01)

(52) U.S. Cl.
  CPC .......... *G06F 16/2423* (2019.01); *G06F 16/29* (2019.01); *G06F 16/90335* (2019.01); *G06F 16/9537* (2019.01)

(58) Field of Classification Search
  USPC .......................................................... 707/706
  See application file for complete search history.

(56) References Cited

U.S. PATENT DOCUMENTS

2008/0104045 A1* 5/2008 Cohen ............... G06F 17/30528

2010/0004851 A1* 1/2010 Kawauchi .......... G01C 21/3611
    701/532

OTHER PUBLICATIONS

Can, F. et al., "Automatic Performance Evaluation of Web Search Engines", Information Processing and Management, May 1, 2004, pp. 495-514, vol. 40, No. 3.
Ali, R. et al., "An Overview of Web Search Evaluation Methods", Computers and Electrical Engineering, Oct. 7, 2011, pp. 835-848, vol. 37, No. 6.
Vaughan, L., "New Measurements for Search Engine Evaluation Proposed and Tested", Information Processing and Management, May 19, 2003, pp. 677-691, vol. 40, No. 4.
International Search Report of PCT/JP2014/079840 dated Dec. 16, 2014.

* cited by examiner

SEMANTIC COMPREHENSION RULE TABLE

| CHARACTER ARRAY | SEMANTIC REPRESENTATION |
|---|---|
| %2 OF %1 | %1 = ADDRESS OR ESTABLISHMENT NAME<br>%2 = GENRE OR ESTABLISHMENT NAME |
| %2 LOCATED IN %1 | %1 = ADDRESS OR ESTABLISHMENT NAME<br>%2 = GENRE OR ESTABLISHMENT NAME |
| %2 CALLED %1 | %1 = ESTABLISHMENT NAME<br>%2 = GENRE OR ESTABLISHMENT NAME |
| ... | ... |

*FIG. 3*

GENRE WORD TABLE

| CHARACTER ARRAY | GENRE |
|---|---|
| RAMEN SHOP, RAMEN RESTAURANT, RAMEN | RAMEN |
| FRENCH, FRENCH CUISINE | FRENCH |
| ITALIAN, ITALIAN CUISINE, ITALIAN FOOD | ITALIAN |
| ... | ... |

*FIG. 4*

ESTABLISHMENT SEARCH RESULT

| ORDER | ESTABLISHMENT NAME | ADDRESS | GENRE | REVIEWS |
|---|---|---|---|---|
| 1 | RAMEN AA | GG, FF TOWN, OMIYA, SAITAMA CITY | RAMEN | I WENT THERE TO EAT LUNCH, AND... |
| 2 | NOODLE SHOP BB | 1H STREET, OMIYA, SAITAMA CITY | RAMEN | |
| 3 | TONKOTSU CC | K, J TOWN, CHUO, SAITAMA CITY | RAMEN | |
| ... | ... | ... | ... | ... |
| 30 | CHINESE NOODLES EE | F, I TOWN, OMIYA, SAITAMA CITY | CHINESE | I RECOMMEND THE MISO OVER THE TONKOTSU... |

*FIG. 6*

EVALUATION RULES

| SEMANTIC REPRESENTATION (8010) | EVALUATION STANDARDS (8020) |
|---|---|
| %1 = ADDRESS, %2 = ESTABLISHMENT NAME | • SET ESTABLISHMENTS IN TOP x HITS TO BE EVALUATED.<br>• IF (NUMBER OF HITS WHERE ADDRESS INCLUDES %1 IS GREATER THAN OR EQUAL TO y AND NUMBER OF HITS WHERE ESTABLISHMENT NAME INCLUDES %2 IS GREATER THAN OR EQUAL TO z) THEN NORMAL<br>  ELSE ANOMALY |
| %1 = ADDRESS, %2 = GENRE | • SET ESTABLISHMENTS IN TOP x HITS TO BE EVALUATED.<br>• IF (NUMBER OF HITS WHERE ADDRESS INCLUDES %1 IS GREATER THAN OR EQUAL TO y AND NUMBER OF HITS WHERE GENRE IS A PERFECT MATCH WITH %2 IS GREATER THAN OR EQUAL TO z) THEN NORMAL<br>  ELSE ANOMALY |
| %1 = ESTABLISHMENT NAME, %2 = GENRE | • SET ESTABLISHMENTS IN TOP x HITS TO BE EVALUATED.<br>• IF (NUMBER OF HITS WHERE ESTABLISHMENT NAME INCLUDES %1 IS GREATER THAN OR EQUAL TO y AND NUMBER OF HITS WHERE GENRE IS A PERFECT MATCH WITH %2 IS GREATER THAN OR EQUAL TO z) THEN NORMAL<br>  ELSE ANOMALY |
| ... | ... |
| (SHARED) | • REFER TO PREVIOUS SEARCH RESULTS FROM SAME QUERY.<br>• IF NO PREVIOUS SEARCH WITH SAME QUERY EXISTS THEN NORMAL<br>  ELSE IF (PERIOD SINCE PREVIOUS SEARCH BY SAME QUERY IS d OR MORE DAYS PRIOR TO PRESENT) THEN NORMAL<br>  ELSE IF (NUMBER OF MATCHING HITS BETWEEN PREVIOUS SEARCH RESULT AND CURRENT SEARCH RESULT IS GREATER THAN OR EQUAL TO y) THEN NORMAL<br>  ELSE ANOMALY |

EVALUATION RULES 9000

| SEMANTIC REPRESENTATION 9010 | EVALUATION STANDARDS 9020 |
|---|---|
| %1 = ADDRESS, %2 = ESTABLISHMENT NAME | • REFER TO RESULTS OF SEARCH BY "%1 = ADDRESS, %2 = ESTABLISHMENT NAME" WITHIN d DAYS PRIOR TO PRESENT<br>• CALCULATE FOLLOWING VALUES FROM REFERRED PREVIOUS RESULTS<br>  PERCENTAGE OF CASES WHERE SEARCH QUERY ADDRESS WAS INCLUDED IN CANDIDATE ADDRESS->Ta[%]<br>  PERCENTAGE OF CASES WHERE SEARCH QUERY ESTABLISHMENT NAME WAS INCLUDED IN CANDIDATE ESTABLISHMENT NAME->Tn[%]<br>• IF (PERCENTAGE OF CANDIDATES WHERE ADDRESS INCLUDES %1 IS GREATER THAN OR EQUAL TO (Ta – w) [%] AND PERCENTAGE OF CANDIDATES WHERE ESTABLISHMENT NAME INCLUDES %2 IS GREATER THAN OR EQUAL TO (Tn – w) [%]) THEN NORMAL<br>  ELSE ANOMALY |
| %1 = ADDRESS, %2 = GENRE | • REFER TO RESULTS OF SEARCH BY "%1 = ADDRESS, %2 = GENRE" WITHIN d DAYS PRIOR TO PRESENT<br>• CALCULATE FOLLOWING VALUES FROM REFERRED PREVIOUS RESULTS<br>  PERCENTAGE OF CASES WHERE SEARCH QUERY ADDRESS WAS INCLUDED IN CANDIDATE ADDRESS->Ta[%]<br>  PERCENTAGE OF CASES WHERE CANDIDATE GENRE MATCHES SEARCH QUERY GENRE->Tg[%]<br>• IF (PERCENTAGE OF CANDIDATES WHERE ADDRESS INCLUDES %1 IS GREATER THAN OR EQUAL TO (Ta – w) [%] AND PERCENTAGE OF CANDIDATES WHERE GENRE IS A PERFECT MATCH WITH %2 IS GREATER THAN OR EQUAL TO (Tg – w) [%]) THEN NORMAL<br>  ELSE ANOMALY |
| %1 = ESTABLISHMENT NAME, %2 = GENRE | • REFER TO RESULTS OF SEARCH BY "%1 = ESTABLISHMENT NAME, %2 = GENRE" WITHIN D DAYS PRIOR TO PRESENT<br>• CALCULATE FOLLOWING VALUES FROM REFERRED PREVIOUS RESULTS<br>  PERCENTAGE OF CASES WHERE SEARCH QUERY ESTABLISHMENT NAME WAS INCLUDED IN CANDIDATE ESTABLISHMENT NAME->Tn[%]<br>  PERCENTAGE OF CASES WHERE CANDIDATE GENRE MATCHES SEARCH QUERY GENRE->Tg[%]<br>• IF (PERCENTAGE OF CANDIDATES WHERE ESTABLISHMENT NAME INCLUDES %1 IS GREATER THAN OR EQUAL TO (Tn – w) [%] AND PERCENTAGE OF CANDIDATES WHERE GENRE IS A PERFECT MATCH WITH %2 IS GREATER THAN OR EQUAL TO (Tg – w) [%]) THEN NORMAL<br>  ELSE ANOMALY |
| ... | ... |

FIG. 9

SEARCH RESULT EVALUATION SYSTEM, NAVIGATION SYSTEM AND SEARCH RESULT EVALUATION METHOD

CLAIM OF PRIORITY

The present application claims priority from Japanese patent application JP2013-235727 filed on Nov. 14, 2013, the content of which is hereby incorporated by reference into this application.

BACKGROUND

The present invention relates to a search result evaluation system for evaluating a search result of a search device.

In recent years, search servers for searching names of establishments, addresses, and the like using character arrays inputted to a smartphone, a car navigation system, or the like have been in use.

JP 2011-22873 A is a disclosure of the background art of such a technical field. JP 2011-22873 A discloses the following: "By determining the region and designated object in a table to be updated on the basis of location search logs, a search that prioritizes distance is applied only to prescribed objects without too much effort. A determination means 20 determines whether the designated object belongs to a specific business type on the basis of a specific business table 15, prior to location search. A weighting modification means 30 temporarily modifies the weighting of each evaluation item used for search such that distance is prioritized when a location search is requested for which it is determined that the object belongs to the specific business type (see abstract)."

Patent Literature 1: JP 2011-22873 A

SUMMARY

However, if the search device of JP 2011-22873 A malfunctions, the user can no longer use the search service or receives an unexpected search result. In addition, depending on changes in specifications or the like of the search device that were not anticipated by the user, service provider, or the like, the behavior of the search device sometimes changes. This can also result in changes in the search results from the search device. Thus, from the perspective of the user who has been continually using the search device, the user cannot continue using the search device in the same manner as before, which can reduce ease of use.

Also, there are multiple users of the search device, and multiple search queries are simultaneously sent to the search device from devices used by the users, and it is difficult to monitor by manual means the changes in behavior in the search device.

An object of the present invention is to provide a search result evaluation system by which it is possible to detect immediately changes in behavior of a search device and to handle such changes such that the changes do not result in inconvenience for users of the search device.

A representative example of the present invention is a search result evaluation system connected with a search device and that evaluates search results of the search device, the search result evaluation system including: a search unit that transmits a search query to the search device; and an evaluation unit that, if the evaluation unit receives search results from the search device, determines whether or not specifications of the search device have been modified, by evaluating the received search results, wherein, if the evaluation unit determines that the specifications of the search device have been modified, the evaluation unit outputs an anomaly signal to notify a manager of the search result evaluation system that the specifications of the search device have been modified.

The following is a simple explanation of effects attained by representative examples of the invention disclosed in the present application. It is possible to provide a search result evaluation system by which it is possible to detect immediately changes in behavior of a search device and to handle such changes such that the changes do not result in inconvenience for users of the search device.

Problems, configurations, and effects other than those described above are clarified by the following detailed description of embodiments.

BRIEF DESCRIPTION OF THE DRAWINGS

FIG. 3 is a descriptive view of the semantic comprehension rule table 3000 of Embodiment 1 of the present invention.

FIG. 4 is a descriptive view of the genre word table of Embodiment 1 of the present invention.

FIG. 6 is a descriptive view of the establishment search results of Embodiment 1 of the present invention.

FIG. 8 is a descriptive view of the evaluation rules of Embodiment 1 of the present invention.

FIG. 9 is a descriptive view of the evaluation rules of a modification example of Embodiment 1 of the present invention.

DETAILED DESCRIPTION OF EMBODIMENTS

Embodiment 1

Below, Embodiment 1 of the present invention will be described with reference to FIGS. 1 to 11. In the present Embodiment, a case will be described in which an establishment name search is performed in a vehicle-installed device, a representative example of which is a car navigation system. However, the present invention is not limited to establishment name searches, and can be applied to song name, address, intersection name, street name, and other information searches. Also, the vehicle-installed device is not limited to a car navigation system, and may be another mobile phone, smartphone, or the like.

Figure 1:
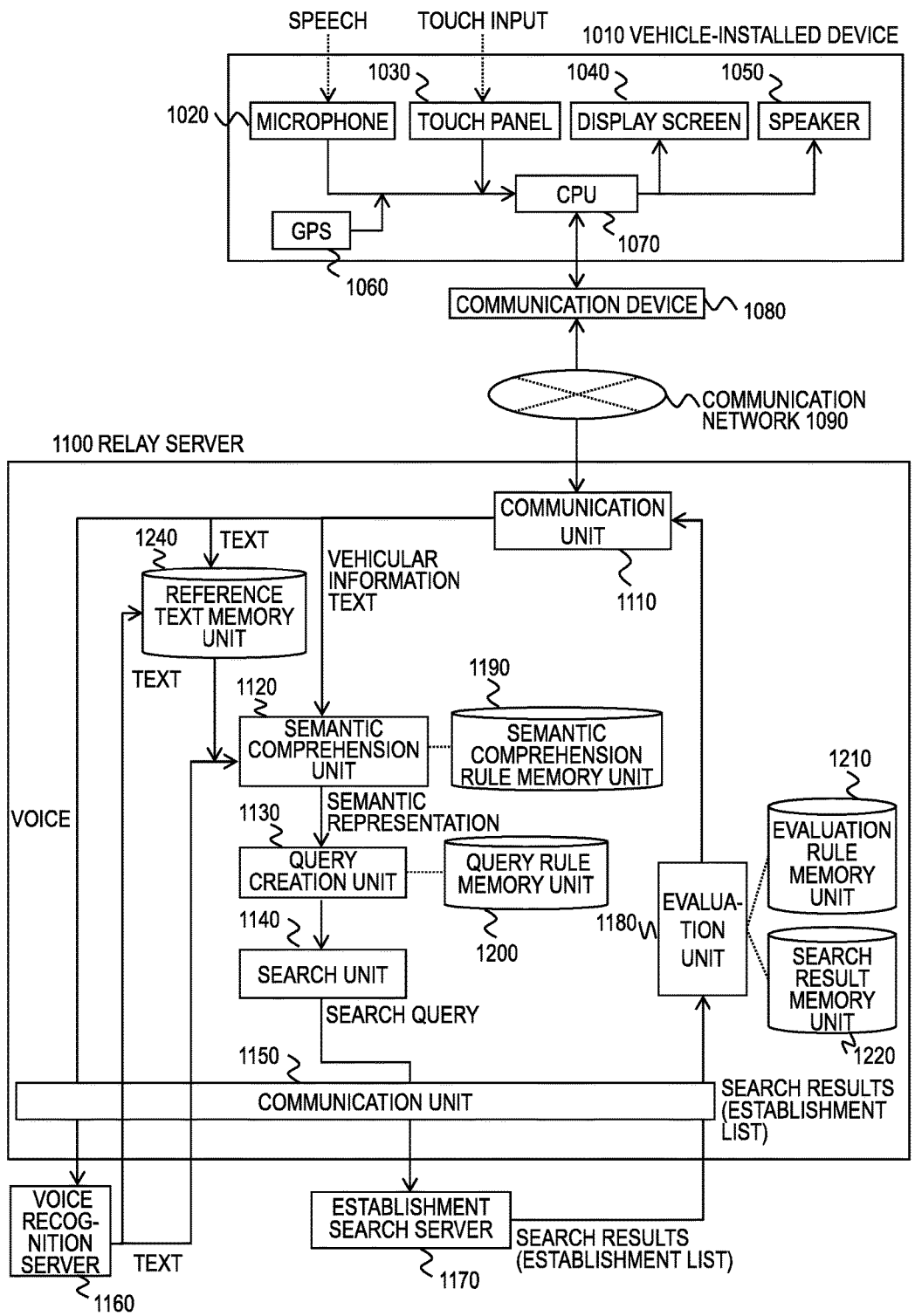
FIG. 1 is a descriptive view of a search system of Embodiment 1 of the present invention.

FIG. 1 is a descriptive view of a search system of Embodiment 1 of the present invention.

The search system has a vehicle-installed device 1010, a relay server 1100, a voice recognition server 1160, and an establishment search server 1170.

The vehicle-installed device 1010 is an information terminal such as a car navigation system that can be used inside a vehicle, for example.

The relay server 1100 is connected to the vehicle-installed device 1010 through a communication network 1090, and is a server that relays communication when the vehicle-installed device 1010 uses an information search service on the internet. The relay server 1100 is connected to the voice recognition server 1160 and the establishment search server 1170, which provide the information search service.

The voice recognition server 1160 converts voice data from a user into text data. The establishment search server 1170 receives a search query from the vehicle-installed device 1010 and searches establishments on the basis of the received search query.

First, details of the vehicle-installed device 1010 will be explained below.

The vehicle-installed device 1010 is a device installed in a vehicle that receives input of search conditions from a user, and is a navigation system that guides the driver of a vehicle along a route, for example. The vehicle-installed device 1010 has a microphone 1020, a touch panel 1030, a display screen 1040, a speaker 1050, a Global Positioning System unit 1060 (GPS), and a CPU 1070.

The microphone 1020 collects speech sounds from a user. The speech sounds collected by the microphone 1020 are used for voice recognition by the voice recognition server 1160. The touch panel 1030 senses information from when a user touches the display screen. The display screen 1040 displays information such as images and characters. The speaker 1050 outputs sound. The GPS unit 1060 obtains positional information of the vehicle in which the vehicle-installed device 1010 is installed.

The vehicle-installed device 1010 is connected to the communication network 1090 through a communication device 1080, and is connected to the relay server 1100. The communication device 1080 is, for example, a mobile phone, a smartphone, or the like. If the vehicle-installed device 1010 is not a navigation system or the like, but rather a device such as a mobile phone or a smartphone that can connect to the communication network 1090, then the communication device 1080 is unnecessary. If the vehicle-installed device 1010 is a navigation system or the like, and the communication means corresponding to the communication device 1080 is provided inside the vehicle-installed device 1010, then the vehicle-installed device 1010 can connected to the communication network 1090 without the use of an external communication device 1080.

Next, details of the relay server 1100 will be explained below.

The relay server 1100 has a communication unit 1110, a semantic comprehension unit 1120, a query creation unit 1130, a search unit 1140, a communication unit 1150, an evaluation unit 1180, an evaluation rule memory unit 1210, a search result memory unit 1220, and a reference text memory unit 1240.

The communication unit 1110 is connected to the vehicle-installed device 1010 through the communication network 1090 and the communication device 1080, and communicates information with the vehicle-installed device 1010. The communication unit 1150 is connected to the voice recognition server 1160 and the establishment search server 1170, and communicates information with the voice recognition server 1160 and the establishment search server 1170.

When the user inputs search conditions to the vehicle-installed device 1010, the vehicle-installed device 1010 transmits the search information including the inputted search conditions and the position information obtained by the GPS unit 1060 to the relay server 1100 through the communication device 1080. The search conditions may be speech sounds collected by the microphone 1020 or text inputted through the touch panel 1030.

When the communication unit 1110 of the relay server 1100 receives the search information, if speech sounds are included in the received search information, the speech sounds are transmitted to the voice recognition server 1160 through the communication unit 1150. When the voice recognition server 1160 receives speech sounds, the speech sounds are recognized, converted to text, and transmitted to the relay server 1100. When the communication unit 1150 of the relay server 1100 receives search conditions that were converted to text and transmitted from the voice recognition server 1160, the search conditions are inputted to the reference text memory unit 1240 and the semantic comprehension unit 1120. The reference text memory unit 1240 will be described in Embodiment 2.

If the search conditions are in text, then the communication unit 1110 inputs the search information to the semantic comprehension unit 1120, and inputs the text search conditions into the reference text memory unit 1240.

If the search information is inputted from the communication unit 1110 or 1150, the semantic comprehension unit 1120 refers to a semantic comprehension rule table 3000 (see FIG. 3) stored in a semantic comprehension rule memory unit 1190, converts the search conditions included in the inputted search information into a semantic representation, and inputs this semantic representation into the query creation unit 1130. In the semantic representation, words included in the search information are placed in association with meanings represented by the words. The semantic comprehension rule memory unit 1190 stores the semantic comprehension rule table 3000 and a genre word table 4000. The semantic comprehension rule table 3000 is described in detail in FIG. 3 and the genre word table 4000 is described in detail in FIG. 4.

The query creation unit 1130 refers to query rules 5000 stored in a query rule memory unit 1200 (see FIG. 5) and converts the semantic representation inputted from the semantic comprehension unit 1120 into a search query compatible with the establishment search server 1170 and inputs the search query to the search unit 1140. The query rules 5000 are described with detail in FIG. 5.

The search unit 1140 transmits the search query inputted from the query creation unit 1130 to the establishment search server 1170 through the communication unit 1150.

If the establishment search server 1170 receives a search query from the relay server 1100, it searches establishments on the basis of the received search query and transmits the search results to the relay server 1100.

When the communication unit 1150 of the relay server 1100 receives the search results, it then inputs the received search results to the evaluation unit 1180.

The evaluation unit 1180 stores the search results inputted from the communication unit 1150 to the search result memory unit 1220, and evaluates the inputted search results with reference to evaluation rules 8000 stored in the evaluation rule memory unit 1210 (see FIG. 8). The evaluation process by the evaluation unit 1180 is described in detail in FIG. 7. The evaluation rules 8000 are described with detail in FIG. 8.

In FIG. 1, the relay server 1100 has a semantic comprehension unit 1120, a query creation unit 1130, a search unit 1140, an evaluation unit 1180, an evaluation rule memory unit 1210, a search result memory unit 1220, and a reference text memory unit 1240, but these units may alternatively be installed in a plurality of computers. For example, the semantic comprehension unit 1120, the query creation unit 1130, and the search unit 1140, which execute a series of processes from when the search information is received to when the search query is transmitted to the establishment search server 1170 may be installed in separate computers from the evaluation unit 1180, which evaluates the search results from the establishment search server 1170.

Figure 2:
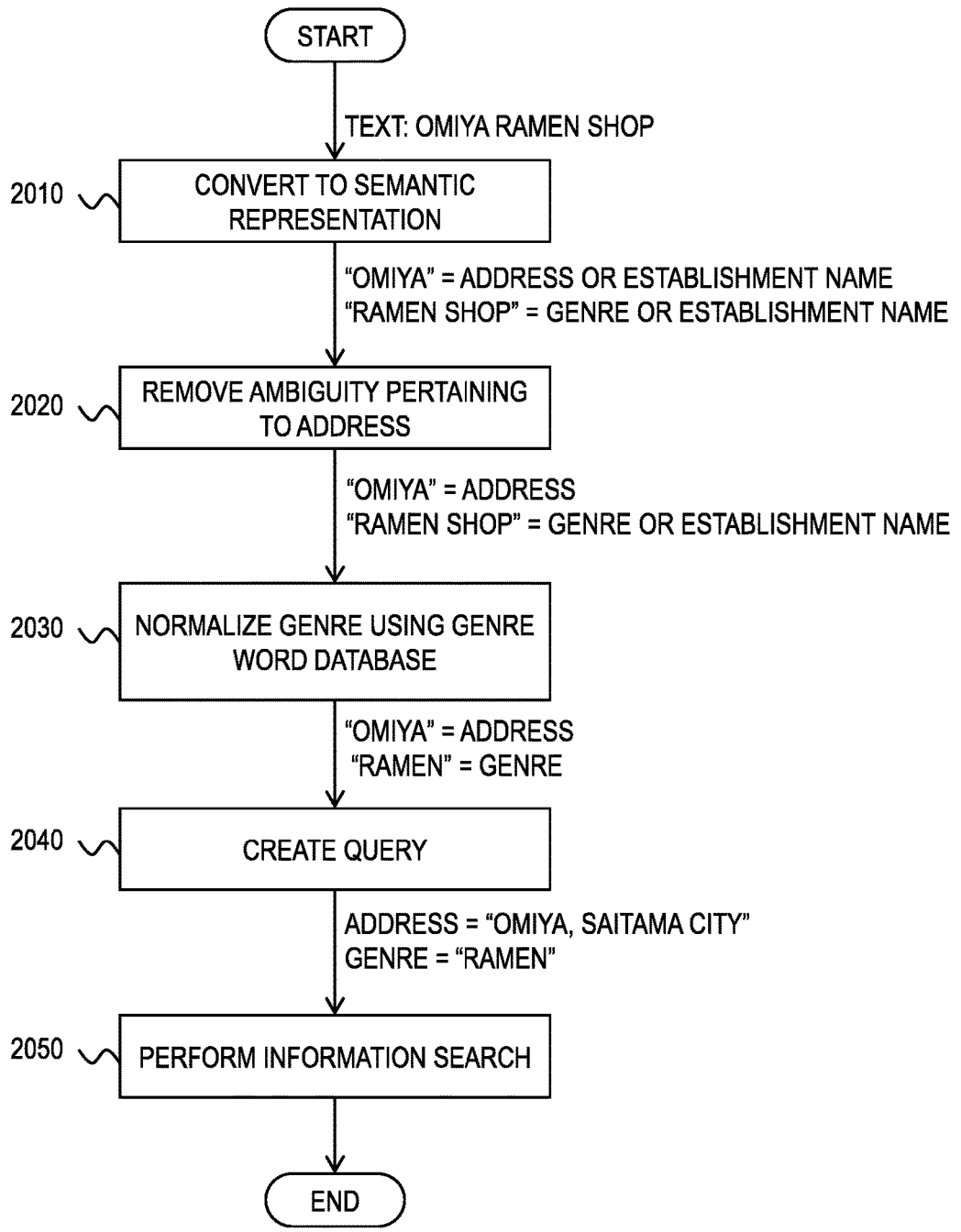
FIG. 2 is a flowchart of a search query transmission process in Embodiment 1 of the present invention.

Next, a series of search query transmission processes from when the relay server 1100 receives search information to when the search query is transmitted to the establishment search server 1170 will be described with reference to FIG. 2. FIG. 2 is a flowchart of a search query transmission process in Embodiment 1 of the present invention.

In the present embodiment, a case will be described in which a user speaks "ramen shop of Omiya" in order to search for a ramen shop in Omiya, Saitama City. The speech sound by the user is captured by the microphone 1020 of the vehicle-installed device 1010. Then, the vehicle-installed device 1010 transmits the search information, including the search conditions in the speech sound and location information, to the relay server 1100. The relay server 1100 transmits the search conditions to the voice recognition server 1160 and the voice recognition server 1160 transmits the text "ramen shop of Omiya" to the relay server 1100. The search conditions may be inputted as text through the touch panel 1030, in which case the search conditions are directly inputted to the semantic comprehension unit 1120.

When the text "ramen shop of Omiya," which is the search condition, is inputted to the semantic comprehension unit 1120, the semantic comprehension unit 1120 refers to the semantic comprehension rule table 3000 stored in the semantic comprehension rule memory unit 1190 to convert the search conditions according to the inputted text to a semantic representation (2010).

The semantic comprehension rule table 3000 will be described with reference to FIG. 3. FIG. 3 is a descriptive view of the semantic comprehension rule table 3000 of Embodiment 1 of the present invention.

The semantic comprehension rule table 3000 includes character arrays 3010 and semantic representations 3020. Character array patterns are recorded in the character array 3010. For example, in FIG. 3, patterns such as "%2 of %1", "%2 in %1", and "%2 called %1" are stored. The semantic representations 3020 include semantic representations corresponding to such patterns. Specifically, the semantic representations 3020 include word meanings corresponding to "%1" or "%2" in the patterns. Word meanings are, for example, addresses, establishment names, and genres.

When the text "ramen shop of Omiya" is inputted to the semantic comprehension unit 1120 according to the semantic comprehension rule table 3000, the inputted text "ramen shop of Omiya" is converted to the semantic representations of "Omiya=address or establishment name" and "ramen shop=genre or establishment name" in order to correspond to the pattern of "%2 of %1" stored in the character array 3010.

In the present embodiment, the search conditions are converted to the semantic representations with reference to the semantic comprehension rule table 3000, which has been stored in advance, but the configuration is not limited thereto. The method for conversion to a semantic representation can include various methods known in the technical field of named-entity recognition.

Next, if there is ambiguity pertaining to the "address" of the semantic representation, the semantic comprehension unit 1120 removes ambiguity pertaining to the "address" using location information included in the search information (2020). Ambiguity pertaining to the "address" refers to a case where it cannot be determined whether the meaning of a certain word is an "address" or something else.

In step 2020, if the location indicated in the location information included in the search information exists near a location indicated by a word that might signify an "address," then the semantic comprehension unit 1120 determines this word to have the meaning of "address."

For example, in the semantic representation "Omiya=address or establishment name," which was converted in step 2010, it is unclear whether "Omiya" is an "address" or an "establishment name," which indicates an ambiguity pertaining to the address. Thus, in step 2020, the semantic comprehension unit 1120 performs a search to determine whether or not an address including "Omiya" exists in the vicinity of the location information included in the search information. If the user is traveling near Saitama City, "Omiya, Saitama City" is searched. In this case, the semantic comprehension unit 1120 determines that the word "Omiya" is an "address" and converts the semantic representation "Omiya=address or establishment name" to "Omiya=address".

If addresses including "Omiya" do not exist in the vicinity of the location information included in the search information, then this indicates a high probability that the word "Omiya" is a portion of an establishment name, and thus, the semantic comprehension unit 1120 converts "Omiya=address or establishment name" to "Omiya=establishment name". In the description below, a case will be described in which the semantic representation is converted to "Omiya=address".

Next, if "genre" is included in the semantic representation, then the semantic comprehension unit 1120 normalizes a "genre" word with reference to the genre word table 4000 stored in the semantic comprehension rule memory unit 1190 (2030). In the establishment search server 1170, there are various words indicating the genre of a certain establishment, but in reality, the user expresses the same genre with the various words. In one example, "Chinese" is set as a genre in the establishment search server 1170, and the user expresses this genre using words such as "Chinese cuisine," "China," and "Chinese restaurant." Thus, in step 2030, the semantic comprehension unit 1120 refers to the genre word table 4000 stored in the semantic comprehension rule memory unit 1190, and converts the genre word in the search conditions inputted by the user to a word set in the establishment search server 1170.

Here, the genre word table 4000 will be described with reference to FIG. 4. FIG. 4 is a descriptive view of the genre word table 4000 of Embodiment 1 of the present invention.

The genre word table 4000 includes character arrays 4010 and genre names 4020. The character arrays 4010 include character arrays of words signifying the same genre. The genre names 4020 include character arrays by which it is possible to search for genres in the establishment search server 1170.

If a word with a high probability of signifying a genre is included in the semantic representation, the semantic comprehension unit 1120 determines whether or not a character array matching the word is included among the character arrays 4010 of the genre word table 4000. If a character array matching the word is included among the character arrays 4010 of the genre word table 4000, the semantic comprehension unit 1120 determines that the word refers to a genre. Then, the semantic comprehension unit 1120 converts the word to a character array recorded as the genre name 4020 in the record in which a character array corresponding to the word is stored. On the other hand, if a character array matching the word is not included among the character arrays 4010 of the genre word table 4000, the semantic comprehension unit 1120 determines that the word refers to an establishment name.

In the present embodiment, "ramen shop" is a word with a high possibility of referring to a "genre," and "ramen shop" is recorded among the character arrays 4010 of the genre word table 4000, and thus, the semantic comprehension unit 1120 determines that "ramen shop" is a "genre" and converts "ramen shop" to "ramen". Thus, the semantic representation "ramen shop=genre or establishment name" is converted to the semantic representation "ramen=genre".

If a character array that matches "ramen shop" is not stored among the character arrays 4010 of the genre word table 4000, then "ramen shop" is not a genre, and in anticipation that "ramen shop" will be searched as an establishment name or another type of text, the semantic comprehension unit 1120 converts the semantic representation "ramen shop=genre or establishment name" to "ramen shop=establishment name."

Next, the query creation unit 1130 refers to query rules 5000 stored in a query rule memory unit 1200 and converts the inputted semantic representation into a search query to be sent to the establishment search server 1170 (2040).

Figure 5:
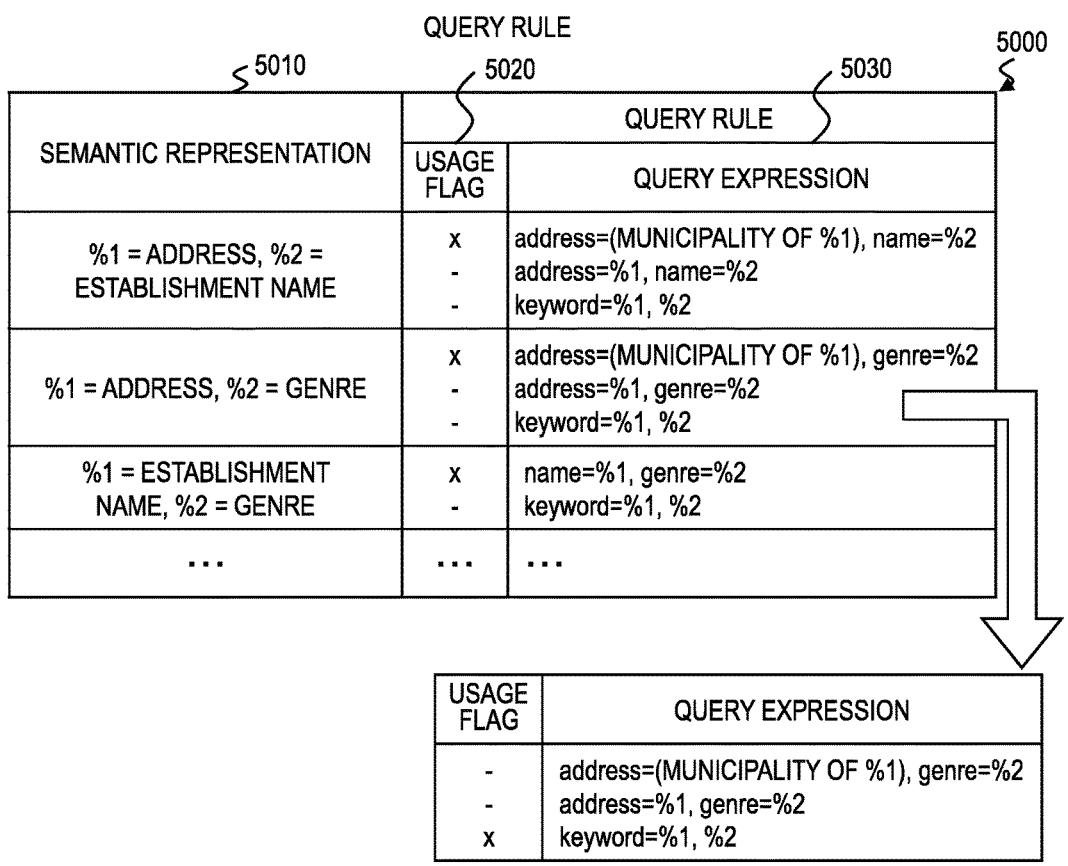
FIG. 5 is a descriptive view of the query rules of Embodiment 1 of the present invention.

The query rules 5000 will be described with reference to FIG. 5. FIG. 5 is a descriptive view of the query rules 5000 of Embodiment 1 of the present invention.

The query rules 5000 include semantic representations 5010, usage flags 5020, and query expressions 5030.

The semantic representations 5010 include semantic representations. The query expressions 5030 includes query expressions (query rules) for converting semantic representations to search queries to actually be sent to the establishment search server 1170. The query expressions 5030 include a plurality of query expressions corresponding to each semantic representation. Each query expression has a corresponding usage flag 5020, and "x" or "-" is recorded for each usage flag 5020. Marking the query expression with the usage flag 5020 "x" indicates that the query expression is to be used for conversion of the semantic representation to a search query, whereas marking the query expression with the usage flag 5020 "-" indicates that the query expression is not to be used for such conversion.

The expression "municipality of %1" in the query rules 5000 shown in FIG. 5 indicates the closest municipality for which the name includes the character array %1.

In the present embodiment, the semantic representations "Omiya=address" and "ramen=genre" inputted to the query creation unit 1130 correspond to the semantic representations "%1=address, %2=genre" stored among the semantic representations 5010 of the query rules 5000 shown in FIG. 5. Of the query expressions in the record, the query expression marked with the usage flag 5020 "x" is "address=(municipality of %1), genre=%2", and thus, the semantic representations "Omiya=address" and "ramen=genre" are converted to the search query "address=Omiya, Saitama City, genre=ramen".

The query expressions stored among the query expressions 5030 are pre-made according to the establishment search server 1170. Also, in the present embodiment, the query expression "address=(municipality of %1)" was converted to "address=Omiya, Saitama City", but such address conversion can be modified according to the specifications of the establishment search server 1170. For example, if the establishment search server 1170 allows for searches to be performed with "Omiya" as the address, the expression may be "address=Omiya".

Next, the search unit 1140 transmits to the establishment search server 1170 the search query "address=Omiya, Saitama City, genre=ramen", obtained by conversion by the query creation unit 1130 (2050), causes the establishment search server 1170 to search this establishment, and then ends the process.

Establishment search results 6000 transmitted by the establishment search server 1170, which executed the establishment search according to the search query "address=Omiya, Saitama City, genre=ramen", will be described with reference to FIG. 6.

FIG. 6 is a descriptive view of the establishment search results 6000 of Embodiment 1 of the present invention.

The establishment search results 6000 are obtained by the establishment search server 1170 by searching for establishments corresponding to the search query, and list the establishments found by this search according to an order of priority set in the establishment search server 1170.

The establishment search results 6000 include an order 6010, establishment names 6020, addresses 6030, genres 6040, and reviews 6050.

The order of priority of the search results is recorded in the order 6010. The names of the establishments are recorded in the establishment names 6020. The addresses of the establishments are recorded in the addresses 6030. The genres of the establishments are recorded in the genres 6040. The reviews of the establishments are recorded in the reviews 6050.

The information included in the establishment search results 6000 differs depending on the type or the like of the establishment search server 1170.

Figure 7:
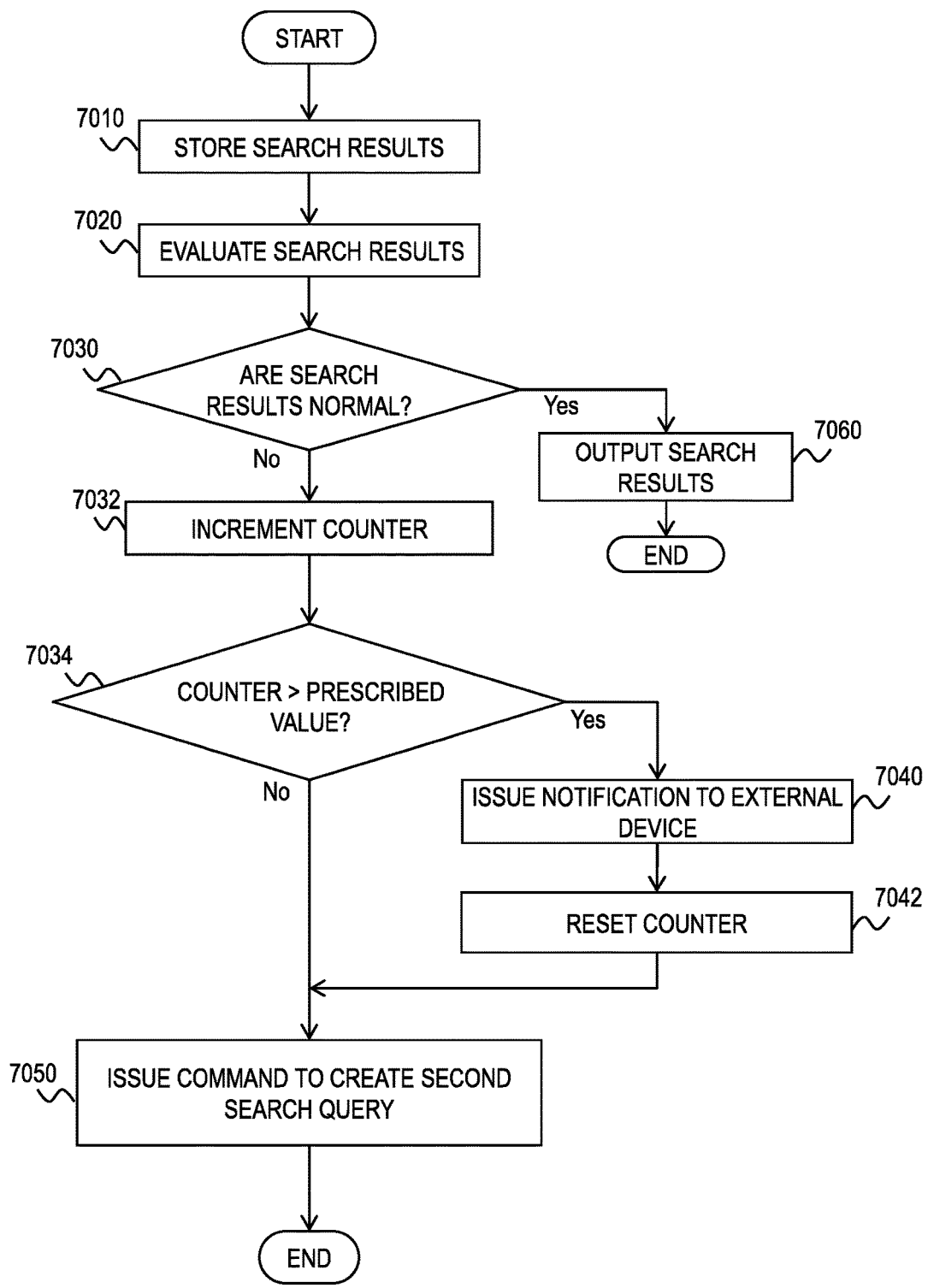
FIG. 7 is a flowchart of an evaluation process performed by the evaluation unit of Embodiment 1 of the present invention.

Next, the evaluation process of the establishment search results 6000 performed by the evaluation unit 1180 will be described with reference to FIG. 7. FIG. 7 is a flowchart of an evaluation process performed by the evaluation unit 1180 of Embodiment 1 of the present invention.

First, if the evaluation unit 1180 receives establishment search results 6000, it stores the received establishment search results 6000 in the search result memory unit 1220 (7010).

Next, the evaluation unit 1180 refers to the evaluation rules 8000 (see FIG. 8) stored in the evaluation rule memory unit 1210, and evaluates the received establishment search results 6000 (7020).

Here, the evaluation rules 8000 will be described with reference to FIG. 8. FIG. 8 is a descriptive view of the evaluation rules 8000 of Embodiment 1 of the present invention.

The evaluation rules 8000 include semantic representations 8010 and evaluation standards 8020. The semantic representations 8010 include semantic representations. The evaluation standards 8020 store standards (evaluation rules) for determining whether or not the search results according to the semantic representations are normal. Specifically, the evaluation standards 8020 include evaluation standards corresponding to respective semantic representations and evaluation standards common to all semantic representations.

First, to describe evaluation standards corresponding to respective semantic representations, an example will be described of the evaluation standards for "%1=address, %2=genre". In these evaluation standards, the evaluation unit 1180 obtains from the search results establishments with a high probability of actually being seen by the user on the display screen, that is, an x number of establishments with the highest order 6010. The evaluation unit 1180 determines whether or not the following conditions are satisfied: among the x number of obtained establishments, the number of hits for establishments including, in the address 6030 thereof, the word "%1" is y or greater; and among the x number of obtained establishments, the number of hits where the genre 6040 is a perfect match with the word "%2" is z or greater. In other words, the evaluation unit 1180 determines whether or not the number of search results used according to the meaning of words in the semantic representation of the search query corresponding to the search results is greater than or equal to a prescribed value.

If the evaluation unit 1180 determines that the conditions are satisfied, it determines that the actual search results from the search performed by the user are appropriate, and that the received search results are normal.

If the evaluation unit 1180 determines that the conditions are not satisfied, it determines that the actual search results from the search performed by the user are not appropriate, and that the received search results are anomalous. x, y, and z are arbitrary values that may be set appropriately by a manager.

The evaluation unit 1180 may determine whether or not the following conditions are satisfied: the percentage of hits for establishments including, in the address 6030 thereof, the word "%1" in relation to the x number of hits is greater than or equal to a prescribed value, and the percentage of hits where the genre 6040 is a perfect match with the word "%2" in relation to the x number of hits is greater than or equal to a prescribed value. Thus, the evaluation unit 1180 can accurately evaluate the received search results even if few establishments are included in the search results.

Next, the evaluation standards common to all semantic representations will be described. According to these evaluation standards, if the search date is within d days of the present, and the number of establishments in common between the search results made with the same search query as the received search results, and the currently received search results, is less than y, then the evaluation unit 1180 can infer that some change has happened in the establishment search server 1170, and that there is an anomaly in the currently received search results.

In other words, by comparing the current search results to previous search results according to the evaluation standards common to all semantic representations, it is possible to determine whether or not the current search results are appropriate. By contrast, the evaluation standards corresponding to the respective semantic representations are used to evaluate the current search results without comparison to the previous search results.

The establishments that exist typically change over time, and thus, search results prior to d days before the current search date are not compared. In this manner, changes in establishments that naturally occur are not detected as false positives of anomalies in the establishment search server 1170. Thus, if search results according to the same search query as the currently received search results are not stored in the search result memory unit 1220, and if search results according to the same search query as the currently received search results are from before d days prior to the present, then the evaluation unit 1180 determines that the received search results are normal.

The order of search results is sometimes modified in the establishment search server 1170 by being accessed from outside for a certain purpose such as search engine optimization. Such modifications in the order of search results are part of the normal operation of the establishment search server 1170, and thus, it is preferable that this modification not be detected as an anomaly in the search results. It is possible to prevent false positives for search results that result from search engine optimization by not taking into consideration the order of search results in the evaluation standards 8020, or by modifying the evaluation standards 8020 by, for example, increasing the number of search result hits (x) to be evaluated.

The evaluation unit 1180 simply needs to evaluate the received search results using the evaluation standards corresponding to the respective semantic representations and/or the evaluation standards common to all semantic representations.

In step 7020, the evaluation unit 1180 may evaluate the received establishment search results 6000 using the evaluation rules 9000 shown in FIG. 9.

FIG. 9 is a descriptive view of the evaluation rules 9000 of a modification example of Embodiment 1 of the present invention.

The evaluation rules 9000 include semantic representations 9010 and evaluation standards 9020. The semantic representations 9010 are the same as the semantic representations 8010, and descriptions thereof are omitted. The evaluation standards 9020 include standards for each semantic representation for determining whether or not characteristics of the search results have changed suddenly. First, to describe evaluation standards 9020, an example will be described of the evaluation standards for "%1=address, %2=genre".

First, according to the evaluation standards 9020, the evaluation unit 1180 obtains, from search results of a search performed within d days ago, search results according to the semantic representation "%1=address, %2=genre". Next, the evaluation unit 1180 calculates the average value (Ta) of percentages of the number of establishments at addresses including words indicating addresses that were in the search query, in relation to the total number of establishments included in the obtained search results. Also, the evaluation unit 1180 calculates the average value (Tg) of percentages of the number of establishments of genres that match the words indicating genres in the search query, in relation to the total number of establishments included in the obtained search results.

Then, if the percentage of the number of establishments at addresses including words indicating addresses that were in the received search results in relation to the total number of establishments included in the received search results is greater than or equal to a value calculated by subtracting a prescribed threshold (w) from Ta, and the percentage of the number of establishments of genres that match the words indicating genres in the search query of the received search results in relation to the total number of establishments included in the received search results is greater than or equal to a value calculated by subtracting the prescribed threshold (w) from Tb, then the evaluation unit 1180 determines that the received search results are normal.

Also, if the percentage of the number of establishments at addresses including words indicating addresses that were in the received search results in relation to the total number of establishments included in the received search results is less than a value calculated by subtracting a prescribed threshold (w) from Ta, or the percentage of the number of establishments of genres that match the words indicating genres in the search query of the received search results in relation to the total number of establishments included in the received search results is less than a value calculated by subtracting the prescribed threshold (w) from Tb, then the evaluation unit 1180 determines that the specifications of the establishment search server 1170 have been modified and that the received search results are anomalous.

Returning to FIG. 7, the evaluation unit 1180 determines whether or not the evaluation results in step 7020 are normal (7030).

If it is determined in step 7030 that the evaluation results in step 7020 are normal, then the evaluation unit 1180 transmits the received search results to the vehicle-installed device 1010 through the communication unit 1110 (7060) and ends the process. If the vehicle-installed device 1010 receives search results transmitted from the relay server 1100, then it displays the received search results in the display screen 1040 and outputs the received search results through the speaker 1050.

On the other hand, if it is determined in step 7030 that the evaluation results in step 7020 are anomalous, then the evaluation unit 1180 increments the counter by 1 (7032). This counter may be provided for each search condition, each semantic representation, or each search query. Next, the evaluation unit 1180 determines whether or not the counter is greater than a prescribed value (7034). If it is determined in step 7034 that the counter is greater than the prescribed value, then the evaluation unit 1180 detects that there is an anomaly in the search results and determines that the specifications of the establishment search server 1170 have been modified, issues a notification to that effect to a manager of the relay server 1100 (7040), resets the counter (7042), and progresses to step 7050. Examples of modifications to the specifications of the establishment search server 1170 include modifications to the settings of the establishment search server 1170 such as modifications to the search algorithm thereof. In order to issue a notification to the manager that the specifications of the establishment search server 1170 have been modified, the evaluation unit 1180 displays a notification to that effect in the display device of a terminal (not shown) operated by the manager of the relay server 1100. Because the manager can be notified that the specifications of the establishment search server 1170 have been modified, he/she can take measures to handle such modifications.

If it is determined in step 7034 that the counter is less than or equal to a prescribed value or after step 7042 has been completed, the evaluation unit 1180 issues a command to the query creation unit 1130 to create a second search query (7050) and ends the process.

In FIG. 7, if a notification is issued once to the manager of the relay server 1100 indicating that an anomaly has been detected in the search results during step 7040, then if anomalies continue to be detected in search results of subsequent evaluation processes and the counter exceeds the prescribed value, then notifications are issued of anomalies in the search results to the manager of the relay server 1100. However, if a notification is issued once to the manager of the relay server 1100 indicating that an anomaly has been detected in the search results, then notification of an anomaly in the search results may be withheld until the search results are determined to be normal.

An example thereof will be described. After execution of step 7040, the evaluation unit 1080 sets a notification flag. The setting of the notification flag is removed when it is determined in step 7030 that the evaluation results are normal. Also, if it is determined in step 7030 that the evaluation results are anomalous, then the evaluation unit 1080 determines whether or not the notification flag has been set, and if it determines that the notification flag has been set, then it progresses to step 7032, and if it determines that the notification flag has not been set, then it does not execute the processes of steps 7032 to 7042 and instead progresses to step 7050.

In this manner, if a notification is issued once to the manager of the relay server 1100 indicating that an anomaly has been detected in the search results, then notification of an anomaly in the search results can be withheld until the search results are determined to be normal.

The process performed when the query creation unit 1130 creates a second search query (second search query creation process) will be described with reference to FIG. 10.

Figure 10:
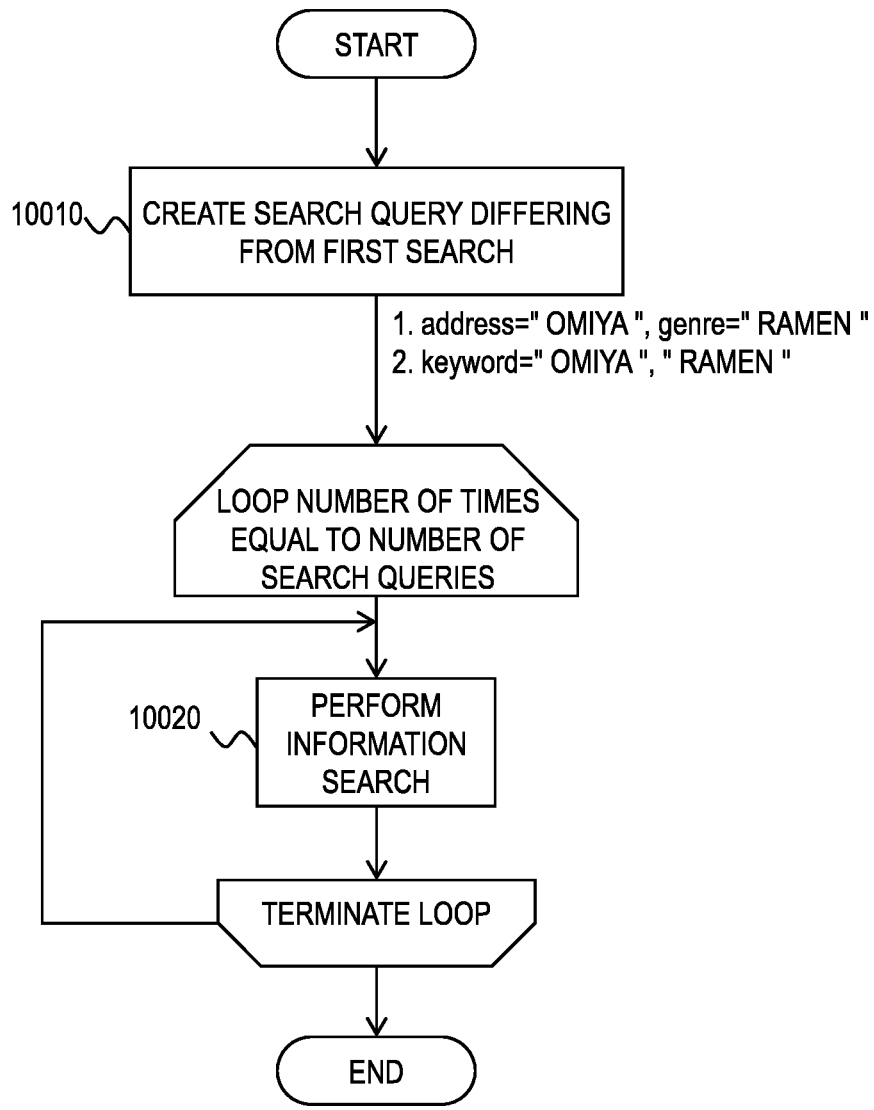
FIG. 10 is a flowchart of a second search query creation process in Embodiment 1 of the present invention.

FIG. 10 is a flowchart of a second search query creation process in Embodiment 1 of the present invention.

The query creation unit 1130 creates a search query differing from the first search query (10010). Specifically, the query creation unit 1130, with reference to the query rules 5000, creates a search query using query expressions ("address=%1, genre=%2" and "keyword=%1, %2"), which are recorded as having a usage flag 5020 of "-" in the record having the semantic representation 5010 "%1=address, %2=genre". The semantic representation is "Omiya=address" and "ramen=genre", and thus, two search queries of "address=Omiya, genre=ramen" and "keyword=Omiya, ramen" are created. The search query for "keyword" indicates that the establishment search server 1170 searches all fields for the establishment data. Thus, by always including "keyword" in all query expressions for every semantic representation, it is possible to search for establishments that match words in the search conditions and some fields.

The search unit 1140 transmits the search query created in step 10010 to the establishment search server 1170 (10020), repeatedly executes step 10020 until all search queries created in step 10010 are transmitted to the establishment search server 1170, and ends the process when all search queries created in step 10010 are transmitted to the establishment search server 1170. Here, the two search queries created in step 10010 are transmitted to the establishment search server 1170.

Figure 11:
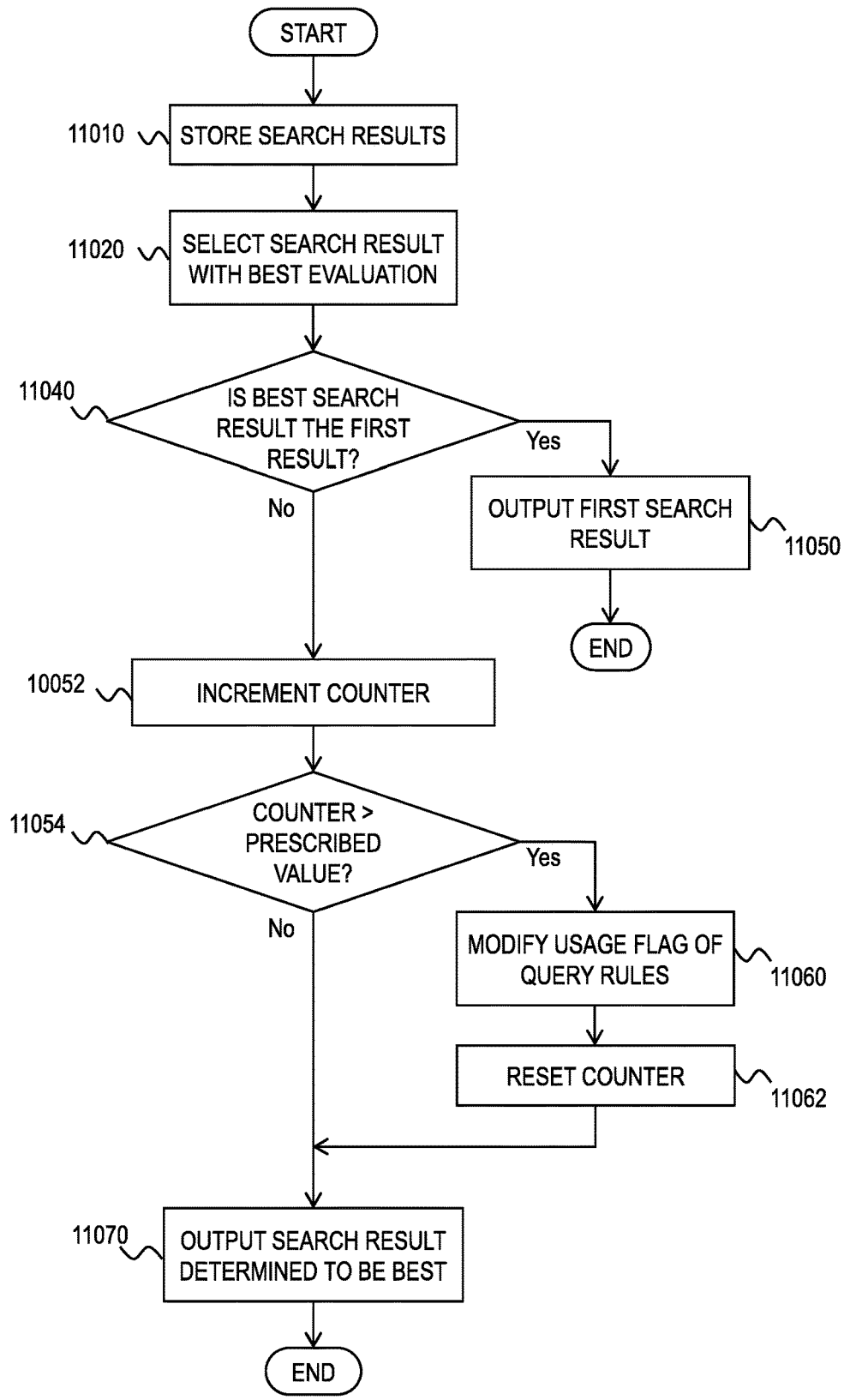
FIG. 11 is a flowchart of a process performed by the evaluation unit of Embodiment 1 of the present invention for when second search results are received.

FIG. 11 is a flowchart of a process performed by the evaluation unit 1180 of Embodiment 1 of the present invention for when second search results are received.

The evaluation unit 1180 receives second search results, and stores the received second search results in the search result memory unit 1220 (11010).

Next, the evaluation unit 1180 selects the search results that are determined to be the best match for the intentions of the user (11020). Step 11020 will be described in detail. In step 2030 of the present embodiment, the semantic representation was determined to be "Omiya=address, ramen=genre". Thus, the evaluation unit 1180 calculates for each search result the number of establishments that include "Omiya" in the address and that belong to a genre that matches "ramen" from among the first search results and the second search results (search results of two search queries). Then, the evaluation unit 1180 selects the search results with the greatest number of establishments as being the best search results.

Next, the evaluation unit 1180 determines whether or not the best search results are the first search results (11040). If it is determined in step 11040 that the best search results are the first search results, then the evaluation unit 1180 transmits the first search results to the vehicle-installed device 1010 through the communication unit 1110 (11050) and ends the process. If the vehicle-installed device 1010 receives the first search results transmitted from the relay server 1100, then it displays the received first search results in the display screen 1040 and outputs the received first search results through the speaker 1050. In such a case, the evaluation unit 1180 may transmit to the vehicle-installed device 1010 a message indicating that the first search results are worse in quality than normal, along with the first search results. If the vehicle-installed device 1010 receives such a message, it outputs a message such as "Would you like to perform another search using different terms?" to the display screen 1040 or the speaker 1050. In this manner, it is possible to allow the user to input search conditions that allow the user to obtain desired search results.

On the other hand, if it is determined in step 11040 that the best search results are not the first search results, that is, when the second search results are the best search results, then the evaluation unit 1180 increments the counter by 1 (10052). This counter may be provided for each search condition, each semantic representation, or each search query.

Next, the evaluation unit 1180 determines whether or not the counter is greater than a prescribed value (11054). If it is determined in step 11054 that the counter is greater than the prescribed value, then the evaluation unit 1180 modifies the query rules 5000 such that "x" is recorded as the usage flag 5020 for the query expression used to create the search query for the best search results (11060). In this case, the evaluation unit 1180 records "-" as the usage flag 5020 of the query expression, which previously had "x" as the usage flag 5020.

If, for example, the search results for the search query "keyword=Omiya, ramen" are the best, then as shown in FIG. 4 the evaluation unit 1180 switches the usage flag 5020 of the query expression "keyword=%1, %2" from "-" to "x", and modifies the usage flag 5020 of the query expression "address=(municipality of %1), genre=%2" from "x" to "-". Then, the query creation unit 1130 creates a search query using the query expression ("keyword=%1, %2") if the semantic representation "%1=address, %2=genre" is inputted.

In this manner, by switching the usage flag, it is possible to provide the user with the best search results that reflect the intentions of the user even if the specifications of the establishment search server 1170 have been modified.

When the evaluation unit 1180 modifies the query rules 5000 in step 11060, it resets the counter (11060) and progresses to step 11070.

If it is determined in step 11054 that the counter is less than or equal to a prescribed value or after step 11060 has been completed, the evaluation unit 1180 transmits the best search results to the vehicle-installed device 1010 through the communication unit 1110 (11070) and ends the process. If the vehicle-installed device 1010 receives the first search results transmitted from the relay server 1100, then it displays the received first search results in the display screen 1040 and outputs the received first search results through the speaker 1050.

According to the present embodiment, it is determined whether or not the specifications of the establishment search server 1170 have been modified on the basis of the search results received by the relay server 1100, and if it is determined that the specifications of the establishment search server 1170 have been modified, a notification to that effect is issued to the manager. In this manner, the manager can detect immediately changes in behavior of a search device and handle such changes such that they do not result in inconvenience for users of the search device.

Also, the user can cause the establishment search server 1170 to search for establishments under search conditions desired by the user and search results desired by the user can be outputted, because the semantic comprehension unit 1120 converts the search conditions inputted by the user to semantic representations and the query creation unit 1130 converts the semantic representations to search queries.

If the evaluation results of the search results received by the relay server 1100 are determined to be anomalous, a command is issued to the query creation unit 1130 to create a second search query, and the query creation unit 1130 generates a second search query using a query expression not used for generating the search query for the first search results, and transmits the second search query to the establishment search server 1170. The evaluation unit 1180 switches the usage flag 5020 for the query expression of the search query for the best search results, from among these search results, to "x" for the semantic representations (see FIG. 7). Thus, even if the specifications of the establishment search server 1170 were modified, the best search results (that is, the search results that are best suited to the user's intentions) for the semantic representations can be outputted to the user.

Also, the evaluation unit 1080 refers to the semantic representations of the search query for the currently received search results and evaluates the current search results, and thus, the user can determine whether the specifications of the establishment search server 1170 have been modified from the perspective of whether the search results conform to the user's intentions.

The evaluation unit 1080 compares the currently received search results with the previously received search results and evaluates the search results, and thus, the user can determine whether the specifications of the establishment search server 1170 have been modified from the perspective of whether the currently received search results have changed from the previous search results.

Next, a modification example of the present embodiment will be described.

In the present embodiment, as described in FIG. 2, the semantic comprehension unit 1120 removes the ambiguity pertaining to the address in step 2020, normalizes the genre by step 2030, and converts the search condition text to one semantic representation, but the semantic comprehension unit 1120 may input a plurality of semantic representations to the search query without removing the ambiguity of the address in step 2020 or normalizing the genre in step 2030.

For example, if "ramen shop of Omiya" is the search condition, then even if the location indicated by the location information included in the search information is near "Omiya", there are still cases in which "Omiya" is an "establishment name". Also, even if "ramen shop" is recorded in the genre word table 4000, there are still cases in which "Ramen Shop" is an "establishment name".

Taking into consideration such variation in meaning, the semantic comprehension unit 1120 of the present modification example generates the following plurality of semantic representations:

"Omiya=address, ramen=genre"
"Omiya=establishment name, ramen=genre"
"Omiya=address, Ramen Shop=establishment name"
"Omiya=establishment name, Ramen Shop=establishment name"

When the semantic representation is inputted, the query creation unit 1130 refers to the query rules 5000 and generates the following search queries:

"address=Omiya, Saitama City, genre=ramen"
"name=Omiya, genre=ramen"
"address=Omiya, Saitama City, name=Ramen Shop"
"name=Omiya, name=Ramen Shop"

The query creation unit 1130 transmits these four search queries to the establishment search server 1170 and the establishment search server 1170 transmits four search results for the respective plurality of queries to the relay server 1100.

A plurality of methods can be used to evaluate the search results using the evaluation unit 1180.

For example, the evaluation unit 1180 may refer to the evaluation rules 8000, and individually evaluate a search result corresponding to one semantic representation using an evaluation standard corresponding to the semantic representation.

Also, the evaluation unit 1180 can combine the four received search results into one search result, and evaluate the one search result. For example, the evaluation unit 1180 may evaluate the combined one search result using an evaluation standard common to all semantic representations shown in FIG. 8, or set a new evaluation standard for the combination of four semantic representations and perform evaluation using this evaluation standard.

Embodiment 2

In the present embodiment, a relay server 1100 transmits a search query based on a reference text 12000 stored in a reference text memory unit 1240 (see FIG. 1) to an establishment search server 1170 at a prescribed timing and evaluates the search results.

Figure 12:
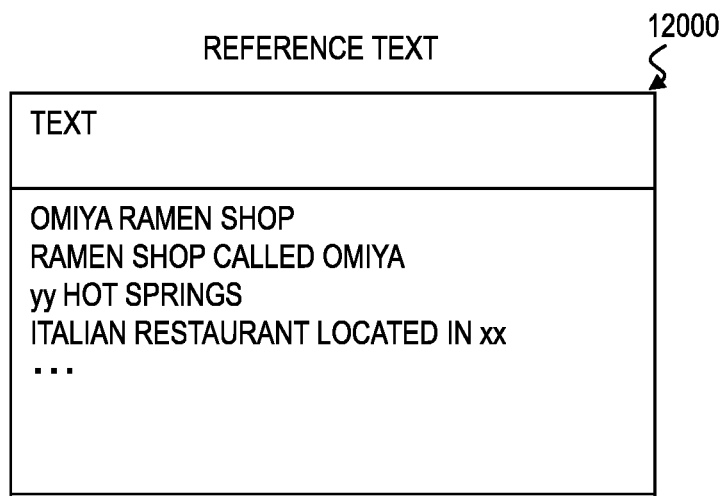
FIG. 12 is a descriptive view of the reference text stored in the reference text memory unit of Embodiment 2 of the present invention.

FIG. 12 is a descriptive view of the reference text 12000 stored in the reference text memory unit 1240 of Embodiment 2 of the present invention.

"ramen shop of Omiya", "ramen shop called Omiya", and the like are stored in the reference text memory unit 1240 as the reference text 12000. The reference text 12000 may inputted by the user as search conditions, or recorded by a manager ahead of time.

The semantic comprehension unit 1120 obtains the reference text 12000 from the reference text memory unit 1240 at a prescribed timing such as 2:00 AM everyday, for example, and similar to Embodiment 1, the obtained reference text 12000 is converted to a semantic representation and inputted to the query creation unit 1130. The query creation unit 1130 converts the inputted semantic representation to a search query and transmits the search query from the search unit 1140 to the establishment search server 1170. When the evaluation unit 1180 receives the search results of the search query, it can evaluate the received search results, and if the evaluation indicates an anomaly, like Embodiment 1, a manager can be notified.

The relay server 1100 may store text indicating search conditions received from the vehicle-installed device 1010 for the past week, and text that has been received a number of times greater than a prescribed value and text having a high rank in terms of the number of times it has been received may be stored in the reference text memory unit 1240 as the reference text 12000, for example. In this manner, modifications in the specifications of the establishment search server 1170 for search conditions that are frequently made by the user can be periodically scanned, and search results according to the user's intentions can be displayed to the user.

According to the present embodiment, by transmitting the search query based on the reference text 12000 at a prescribed timing to the establishment search server 1170, it is possible to determine whether modifications have been made in the specifications of the establishment search server 1170 at the prescribed timing.

Embodiment 3

In Embodiments 1 and 2, the text of the search conditions received by the relay server 1100 are converted by the semantic comprehension unit 1120 to a semantic representation, and after the query creation unit 1130 converts the semantic representation to a search query, the search query is transmitted to the establishment search server 1170. If the establishment search server 1170 can receive the search condition text as is, then there is no need for the semantic comprehension unit 1120 and the query creation unit 1130 of the relay server 1100 to perform conversion processes, and thus, the relay server 1100 may lack the semantic comprehension unit 1120 and the query creation unit 1130.

A case in which the establishment search server 1170 can receive the search condition text as is, for example, a case in which the establishment search server 1170 has the semantic comprehension unit 1120 and the query creation unit 1130, the text received from the relay server 1100 is converted to a semantic representation, and the semantic representation is further converted to a search query, with the search query being used to search for an establishment from among the establishment data, or the like.

If the evaluation unit 1180 receives search results, then the process shown in FIG. 7 is executed and the search results are evaluated. In this case, the search conditions are not converted to a semantic representation by the relay server 1100, and thus, the evaluation unit 1180 cannot evaluate the search results using the evaluation standards for each semantic representation according to the evaluation rules 8000 and 9000 shown in FIGS. 8 and 9. Thus, in the present embodiment, the evaluation unit 1180 evaluates the search results using an evaluation standard common to each semantic representation according to the evaluation rules 8000 shown in FIG. 8.

If, for example, the search unit 1140 transmits to the establishment search server 1170 the text "ramen shop of Omiya", and the evaluation unit 1180 receives the search results for "ramen shop of Omiya", then the received search results are evaluated by comparing the search results for the received text "ramen shop of Omiya" to the search results from when "ramen shop of Omiya" was previously searched. If the evaluation unit 1180 determines that the evaluation results are anomalous, it does not issue a command to create a second search query in step 7050, and terminates the process without executing step 7050, but other processes are the same as in FIG. 7.

In this manner, according to the present embodiment, the relay server 1100 does not have a semantic comprehension unit 1120 or a query creation unit 1130, and the present invention can be applied even to a case in which the establishment search server 1170 can use the text as is in the query.

The present invention is not limited to the above-described embodiments but includes various modifications.

The above-described embodiments are explained in details for better understanding of the present invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

A representative example of the present invention other than what is disclosed in the claims is as follows. A search result evaluation system, comprising: a search result memory unit that stores a search query and search results corresponding to the search query in association with each other, wherein evaluation rules include a rule for evaluating the search results in which, if an evaluation unit receives the search results, past search results of a search query corresponding to a search query of the received search results are obtained with reference to the search result memory unit, and the received search results and the obtained past search results are compared.

What is claimed is:

1. A search result evaluation system connected with a search device and that evaluates search results of the search device, the search result evaluation system comprising:
   a processor and a memory, the memory storing instructions that when executed by the processor configure the processor to:
   automatically convert search conditions inputted by a user to a semantic representation in which words constituting the search conditions are associated with respective meanings of the words,
   with reference to query rules for converting the semantic representation to a search query, automatically convert the semantic representation obtained by the conversion to the search query,
   transmit to the search device the search query obtained by the conversion,
   upon receiving a plurality of search results that each include a name, an address and a genre from the search device, determine whether specifications of the search device have been modified, by evaluating the received plurality of search results,
   upon determining that a one or more first words indicates an address and that a one or more second words indicates a name, evaluate each of the plurality of search results based on a first rule,
   upon evaluating each of the plurality of search results based on the first rule, determine that the plurality of search results is normal or abnormal based on whether a number of times the address of each search result includes the one or more first words is greater than a first predetermined number and the number of times the name includes the one or more second words is greater a second predetermined number,
   upon determining that the one or more first words indicates an address and that the one or more second words indicates a genre evaluate each of the plurality of search results based on a second rule,
   upon evaluating each of the plurality of search results based on the second rule, determine that the plurality of search results is normal or abnormal based on whether a number of times the address of each search result includes the one or more first words is greater than a third predetermined number and the number of times the genre matches the one or more second words is greater than a fourth predetermined number, and
   upon determining that a number of instances that the plurality of search results is abnormal is greater than a fifth predetermined number, output an anomaly signal to notify a manager of the search result evaluation system that the specifications of the search device have been modified.

2. The search result evaluation system according to claim 1,
   wherein, the processor is further configured to upon the specifications of the search device are determined to have been modified, use query rules other than the previously used query rules, among the query rules corresponding with the semantic representation, to convert the semantic representation to the search query, and
   transmit to the search device the search query obtained by conversion as a second search query.

3. The search result evaluation system according to claim 2,
   wherein the processor is further configured to:
   determine a best search result, from among a search result of a first search query and a search result of the second search query, that is most suited to what the user intends to search on the basis of the semantic representation, when the search result of the second search query is received, and
   modify the query rules, used for conversion of the search query of the best search result to the search query, to the usage query rules, if the identified best search result is the search result of the second search query.

4. A navigation system connected with the search result evaluation system according to claim 1,
   wherein the navigation system: is installed in a vehicle, guides the vehicle along a path, receives input of search conditions from a user, and transmits the received search conditions to the search result evaluation system, and
   wherein the search query of the transmitted search conditions is transmitted to the search device from the search result evaluation system.

5. A search result evaluation method by which search results of a search device are evaluated in a search result evaluation system connected to the search device, the method comprising:
   automatically converting search conditions inputted by a user to a semantic representation in which words constituting the search conditions are associated with meanings indicated by the words,
   with reference to query rules for converting the semantic representation to a search query, automatically converting the semantic representation obtained by the conversion to the search query,
   transmitting to the search device the search query obtained by the conversion,
   upon receiving a plurality of search results that each include a name, an address and a genre from the search device, determining, by the search result evaluation system, whether specifications of the search device have been modified by evaluating the plurality of search results received from the search device, upon determining that a one or more first words indicates an address and that a one or more second words indicates a name, evaluate each of the plurality of search results based on a first rule, upon evaluating each of the plurality of search results based on the first rule, determine that the plurality of search results is normal or abnormal based on whether a number of times the address of each search result includes the one or more first words is greater than a first predetermined number and the number of times the name includes the one or more second words is greater a second predetermined number, upon determining that the one or more first words indicates an address and that the one or more second words indicates a genre evaluate each of the plurality of search results based on a second rule, upon evaluating each of the plurality of search results based on the second rule, determine that the plurality of search results is normal or abnormal based on whether a number of times the address of each search result includes the one or more first words is greater than a third predetermined number and the number of times the genre matches the one or more second words is greater than a fourth predetermined number, and upon determining a number of instances that the plurality of search results is abnormal is greater than a fifth predetermined number outputting, by the search result evaluation system, an anomaly signal to notify a manager of the search result evaluation system that the specifications of the search device have been modified.

6. The search result evaluation method according to claim 5, wherein the method further comprises:

converting, by the search result evaluation system, the semantic representation to the search query using query rules other than the previously used query rules among the query rules corresponding with the semantic representation, if the specifications of the search device are determined to have been modified, and transmitting, by the search result evaluation system, the search query, obtained by conversion as a second search query, to the search device.

7. The search result evaluation method according to claim 6, wherein the method further comprises:

determining, by the search result evaluation system, a best search result, from among a search result of a first search query and a search result of the second search query, that is most suited to what the user intends to search on the basis of the semantic representation, when the search result of the second search query is received from the search device, and modifying, by the search result evaluation system, the query rules, used for conversion of the search query of the best search result to the search query, to the usage query rules, if the identified best search result is the search result of the second search query.

* * * * *